United States Patent [19]
Takuma et al.

[11] Patent Number: 5,615,045
[45] Date of Patent: Mar. 25, 1997

[54] SCREEN OF PROJECTION DISPLAY

[75] Inventors: Hirokazu Takuma; Hiromitsu Takeuchi; Takaomi Hanabusa, all of Kanagawa, Japan

[73] Assignee: Sony Corporation, Japan

[21] Appl. No.: 468,070

[22] Filed: Jun. 6, 1995

Related U.S. Application Data

[62] Division of Ser. No. 170,907, Dec. 21, 1993, Pat. No. 5,448,401.

[30] Foreign Application Priority Data

Dec. 25, 1992 [JP] Japan .................................. 4-359600
Dec. 29, 1992 [JP] Japan .................................. 4-360037

[51] Int. Cl.$^6$ ................................................ G03B 21/60
[52] U.S. Cl. ........................ 359/456; 359/443; 359/453; 359/457; 359/460
[58] Field of Search .................................. 359/443, 453, 359/456, 457, 460

[56] References Cited

U.S. PATENT DOCUMENTS

| | | | |
|---|---|---|---|
| 4,923,280 | 5/1990 | Clausen et al. | 350/128 |
| 4,927,233 | 5/1990 | Nakanishi et al. | 350/128 |
| 5,066,099 | 11/1991 | Yoshida et al. | 359/457 |
| 5,076,661 | 12/1991 | Bradley | 359/456 |
| 5,161,042 | 11/1992 | Hamada | 359/41 |
| 5,337,186 | 8/1994 | Oikawa et al. | 359/628 |

*Primary Examiner*—Safet Metjahic
*Assistant Examiner*—D. P. Malley
*Attorney, Agent, or Firm*—Ronald P. Kananen

[57] ABSTRACT

A longitudinal-stripe lenticular lens screen and a transverse-stripe lenticular lens screen are superposed, and a light diffusing agent is mixed only in the longitudinal-stripe lenticular lens screen. Therefore, the light transmittance is high although the angle of view can be three-dimensionally widened by the two lenticular lens screens. In addition, since scan lines of an image are blurred by two diffusion planes, Moiré becomes inconspicuous.

3 Claims, 7 Drawing Sheets

SCREEN OF PROJECTION DISPLAY

This application is a division of application Ser. No. 08/170,907 filed Dec. 21, 1993 U.S. Pat. No. 5,448,401.

BACKGROUND OF THE INVENTION

1. Field of the Invention

The present invention relates to a screen for use in a projection display which displays an image by projecting onto a screen.

2. Description of the Prior Art

As shown in FIG. 1, a projection display enlarges an image displayed on, e.g., a cathode-ray tube 11 and projects the enlarged image onto a screen 13 by using a projection lens 12. Such projection displays are divided into two categories, a front type (reflection type) and a rear type (transmission type), according to the type of the screen 13.

The screen 13 of the rear type projection display is, as shown in FIG. 2, generally constituted by a longitudinal-stripe lenticular lens screen 14, in which lenticular lenses extend in the longitudnal direction, and a Fresnel lens screen 15. Note that a mirror 16 is arranged between the projection lens 12 and the screen 13 to bend an optical path, thereby decreasing the dimensions of the projection display.

The Fresnel lens screen 15 causes light 17 of a projected image to be incident perpendicularly to the lenticular lens screen 14. The lenticular lens screen 14 refracts the incident light 17 and thereby diffuses the light 17 emerged from it.

In a conventional screen of a projection display, as shown in FIGS. 3A and 3B, a light diffusing agent 21 is mixed in the lenticular lens screen 14 in order to increase the diffusion angle of the light 17. Note that, in order to prevent a decrease in contrast caused by reflection of external light, a black surface 22 which consists of black stripes is formed on the exit surface of the lenticular lens screen 14 except for the positions of the lenticular lenses.

In a conventional screen of a projection display of the above sort, however, although a practically satisfactory angle of view can be obtained in the horizontal direction with the aid of the lenticular lens screen 14, the angle of view in the vertical direction is narrow since only the effect of the light diffusing agent 21 is useful in this direction. When the angle of view in the vertical direction is narrow, a screen which is bright when a viewer watches it while sitting in a chair or on a floor is dark if, for example, he or she watches it while lying on a floor, and so no high-quality images can be displayed in that case.

To widen the angle of view in the vertical direction, therefore, the amount of the light diffusing agent 21 to be mixed in the lenticular lens screen 14 may be increased, or, as shown in FIG. 4, a transverse-stripe lenticular lens screen 23 may be superposed on the longitudinal-stripe lenticular lens screen 14.

The use of the two lenticular lens screens 14 and 23, however, increases the manufacturing cost. For this reason, as shown in FIGS. 5A to 5C, it has been attempted to use a single microlens screen 24 in which a plurality of microlenses are arranged into a matrix-like pattern in place of the two lenticular lens screens 14 and 23.

If, however, the amount of the light diffusing agent 21 to be mixed in the lenticular lens screen 14 is increased, reflection of incident light is increased to decrease the light transmittance, and this decreases the brightness and contrast of an image.

In addition, if the transverse-stripe lenticular lens screen 23 is additionally formed and the light diffusing agent 21 is mixed in both of the two lenticular lens screens 14 and 23, the light transmittance decreases to decrease the brightness and contrast of an image. If, in contrast, the light diffusing agent 21 is mixed in neither the lenticular lens screen 14 nor 23, Moiré becomes conspicuous between the lenticular lenses of the transverse-stripe lenticular lens screen 23 and scan lines of an image. Therefore, none of the above conventional examples can display high-quality images.

FIGS. 6 to 8 illustrate a three-tube rear projection display and a conventional example of a screen used in this display. In this display, cathode-ray tubes 31, 32 and 33 for displaying red, green and blue images are arranged horizontally, and projection lenses 41 to 43 project light components 34 to 36 which are modulated by their respective colors. The screen is constituted by a Fresnel lens screen 44 and a lenticular lens screen 45. Note that no mirror is shown in these drawings.

The Fresnel lens screen 44 causes the light components 34 to 36, which are projected by the projection lenses 41 to 43, to be incident perpendicularly to lenses 45a on the incident side of the lenticular lens screen 45. The lenticular lens screen 45 synthesizes the incident light components 34 to 36 to form a color image and also widens the light components 34 to 36 of a displayed image, which emerge from lenses 45b on the exit side, in the horizontal direction rather than in the vertical direction.

Since the cathode-ray tubes 31, 32 and 33 for displaying red, green and blue images are arranged at different positions, angles at which the light components 34 to 36 modulated by their respective colors are incident on the lenticular lens screen 45 also differ from one another. Consequently, as shown in FIG. 7, images of the light components 34 to 36 are formed at different positions on the surface of each lens 45b on the exit side.

Between the individual lenses 45b, on the other hand, a black nonreflecting portion, i.e., a black surface, which is called black stripes 46, is formed into longitudinal stripes in order to absorb external light and to thereby increase the contrast of a displayed image with respect to the external light. In this conventional example, the black stripes 46 project in the exit direction of the light components 34 to 36 farther than the lenses 45b.

In this conventional example as described above, if the screen is viewed obliquely, as shown in FIG. 8, all of the light components 34 to 36 of the respective colors shown in FIG. 7 can be seen in a region in which an angle defined between the normal to the lenticular lens screen 45 and the viewing direction of an eye is small (angle=$\theta_2$).

In this conventional example, however, the black stripes 46 project in the exit direction farther than the lenses 45b as described above. Therefore, in a region in which the angle defined between the normal to the lenticular lens screen 45 and the viewing direction of an eye is large (angle=$\theta_1$), it is impossible to see the light components 34 to 36 emerged from the skirt of the lens 45b since they are eclipsed by the black stripe 46.

This gives rise to a phenomenon called color shift or color shading in which, even if an image of the same color is displayed on the entire surface of the screen, the color of the image changes depending on the angle at which a viewer watches the screen. Therefore, the conventional example shown in FIGS. 6 to 8 cannot display high-quality images.

SUMMARY OF THE INVENTION

The first screen of a projection display according to the present invention comprises two lenticular lens screens superposed such that the extending directions of respective lenticular lenses are perpendicular and parallel to the direction of scan lines of an image to be displayed, wherein a light diffusing agent is not mixed in at least one of the lenticular lens screens. Therefore, the angle of view can be widened three-dimensionally by the two lenticular lens screens, and the light transmittance is high because a light diffusing agent is not mixed in at least one of the lenticular lens screens.

The second screen of a projection display according to the present invention comprises a first lenticular lens screen in which the extending direction of lenticular lenses is perpendicular to the direction of scan lines of an image to be displayed, and a light diffusing agent is mixed, and a second lenticular lens screen in which the extending direction of lenticular lenses is parallel to the direction of scan lines and no light diffusing agent is mixed, and which is superposed on the first lenticular lens screen. Therefore, the angle of view can be widened three-dimensionally by the first and second lenticular lens screens, and the light transmittance is high because the light diffusing agent is mixed in only the first lenticular lens screen. In addition, light of an image being displayed can be widened in the direction perpendicular to the direction of the scan lines of that image with the aid of both the light diffusing agent mixed in the first lenticular lens screen and the second lenticular lens screen. This blurs the scan lines and thereby makes Moiré inconspicuous.

The third screen of a projection display according to the present invention has an arrangement in which, in the second screen of a projection display described above, the first lenticular lens screen is located on the light incident side of an image, and the second lenticular lens screen is located on the light exit side. That is, the first lenticular lens screen in which the light diffusing agent is mixed is located on the light incident side of an image. Therefore, if a light absorption surface is formed on the second lenticular lens screen except for the positions of the lenticular lenses, external light reflected by the light diffusing agent mixed in the first lenticular lens screen can be absorbed by the light absorption surface. This further increases the contrast of an image.

The fourth screen of a projection display according to the present invention comprises first and second lenticular lens screens superposed such that the extending directions of respective lenticular lenses are different, wherein the extending direction of the lenticular lenses of the first lenticular lens screen is inclined with respect to the direction of scan lines of an image to be displayed, and the extending direction of the lenticular lenses of the second lenticular lens screen is either perpendicular to or inclined with respect to the direction of the scan lines. Therefore, the angle of view can be widened three-dimensionally by the first and second lenticular lens screens. In addition, the extending direction of the lenticular lenses of neither the first nor second lenticular lens screen is parallel to the direction of the scan lines of an image. For this reason, Moiré is inconspicuous compared to that when the extending direction of the lenticular lenses of either screen is parallel to the scan line direction because the frequency of the Moiré is high.

The fifth screen of a projection display according to the present invention comprises a microlens screen in which a plurality of microlenses are so arranged as to form a matrix, wherein the extending direction of the matrix is inclined with respect to the direction of scan lines of an image to be displayed. Therefore, the angle of view can be widened three-dimensionally by the microlens screen. In addition, the extending direction of the microlenses is not parallel to the direction of the scan lines of an image. For this reason, since the frequency of Moiré is high, the Moiré is inconspicuous compared to that when the direction of the microlenses is parallel to the scan line direction.

The sixth screen of a projection display according to the present invention comprises a microlens screen in which a plurality of microlens arrays, each of which consists of a plurality of microlenses arranged in a direction perpendicular to the direction of scan lines of an image to be displayed, are formed in the direction of the scan lines, and the microlenses in adjacent arrays are offset by a half of a pitch between the microlenses in the respective arrays in the direction perpendicular to the direction of the scan lines. Therefore, the angle of view can be widened three-dimensionally by the microlens screen. In addition, since the spacing between the microlenses is equivalent to a half of the actual spacing in the direction perpendicular to the direction of the scan lines of an image, Moiré is inconspicuous because its frequency is high.

In the first to sixth screens of a projection display, therefore, although the angle of view can be widened three-dimensionally, the brightness and contrast of an image are high because the light transmittance is high, and Moiré is inconspicuous. This makes it possible to display high-quality images.

The seventh screen of a projection display according to the present invention comprises a lenticular lens screen in which at least the apex of each lens on the light exit side projects in the light exit direction farther than a black surface. That is, at least the apex of each lens on the light exit side of the lenticular lens screen projects in the light exit direction farther than the black surface. Consequently, even when the screen is viewed obliquely, light emerged from each lens is eclipsed little by the black surface. In this seventh screen of a projection display, therefore, since light emerged from each lens is eclipsed little by the black surface even if the screen is viewed obliquely, color shift and color shading are also little, and this makes display of high-quality images possible.

BRIEF DESCRIPTION OF THE DRAWINGS

FIGS. 3A and 3B show the problem of the first conventional example, in which FIG. 3A is a vertical side view and FIG. 3B is a horizontal side view;

FIGS. 5A to 5C show the third conventional example, in which FIG. 5A is a front view, FIG. 5B is a rear view, and FIG. 5C is a side view;

FIGS. 9A and 9B show the second embodiment of the present invention, in which FIG. 9A is a vertical side view and FIG. 9B is a horizontal side view;

DETAILED DESCRIPTION OF THE PREFERRED EMBODIMENTS

Figure 1:
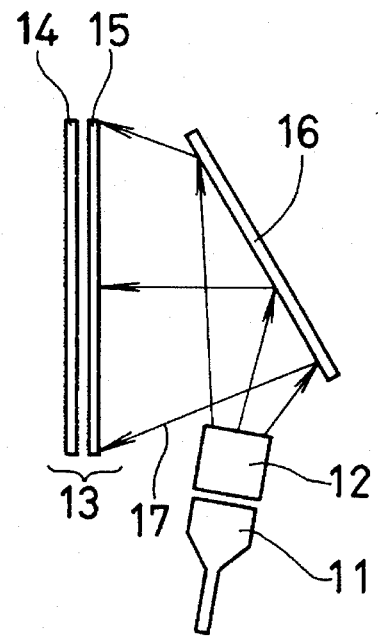
FIG. 1 is a schematic side view showing a projection display to which the present invention is applicable.
Figure 2:
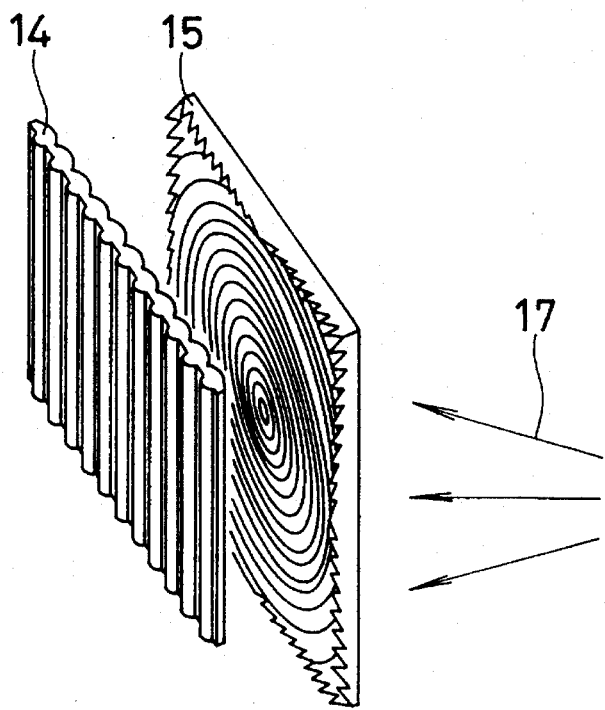
FIG. 2 is a perspective view showing the first conventional example of the present invention.
Figure 3A:
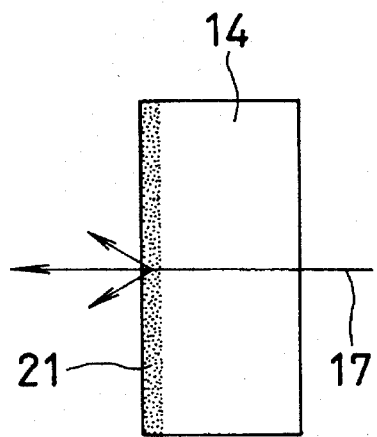
Figure 3B:
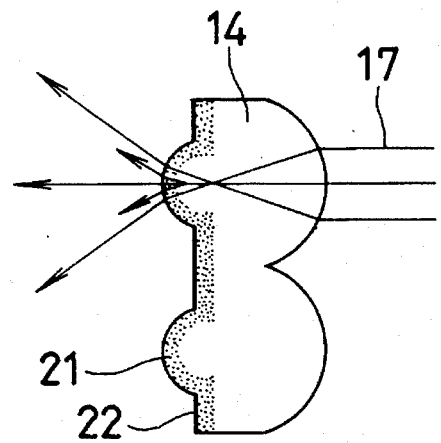

The first to eighth embodiments of the present invention will be described below with reference to FIGS. 9A to 15. Note that the same reference numerals as in the conventional examples shown in FIGS. 1 to 7 denote the same parts in these embodiments.

Figure 4:
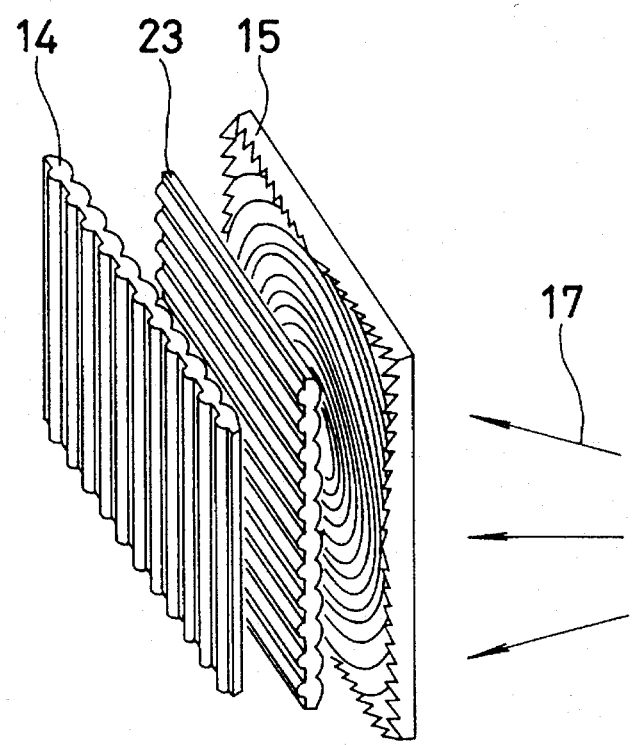
FIG. 4 is a perspective view showing the second conventional example.
Figure 5A:
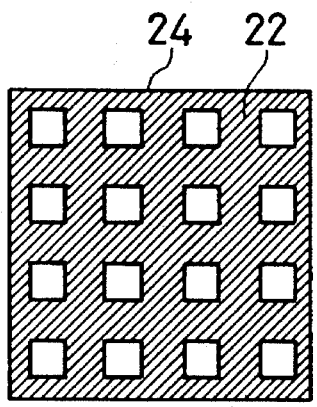
Figure 5B:
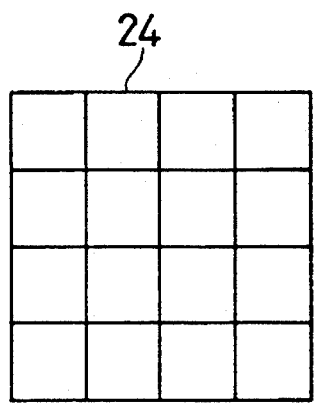
Figure 5C:
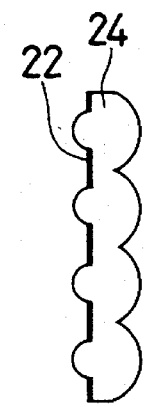

The first embodiment of the present invention will be described first. In this first embodiment, as shown in FIG. 4, a transverse-stripe lenticular lens screen 23 is superposed on a longitudinal-stripe lenticular lens screen 14. This first embodiment has essentially the same arrangement as that of the conventional example illustrated in FIG. 4 except that a light diffusing agent 21 is not mixed in at least one of the two lenticular lens screens 14 and 23.

In the first embodiment with this arrangement, although the angle of view can be widened three-dimensionally by the two lenticular lens screens 14 and 23, reflection of incident light is little and therefore the light transmittance is high compared to a structure in which the light diffusing agent 21 is mixed in both the lenticular lens screens 14 and 23. Consequently, the brightness and contrast of an image are high, and this makes it possible to display high-quality images.

Figure 9A:
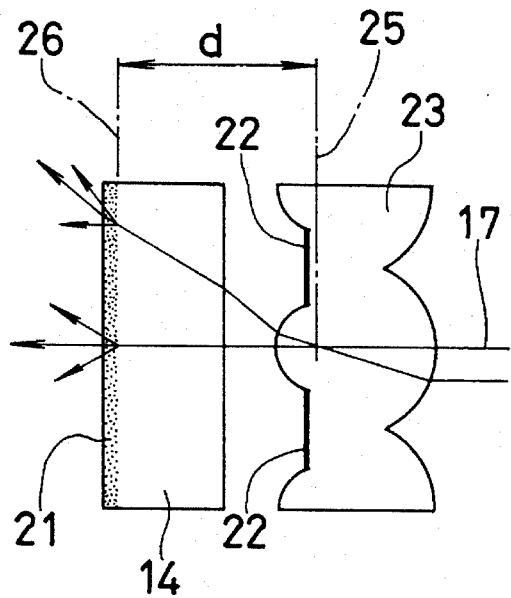
Figure 9B:
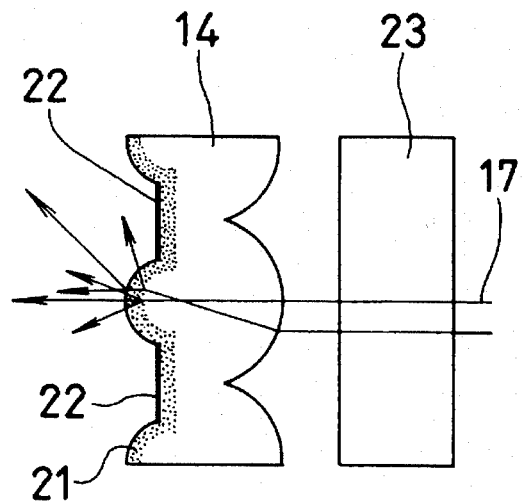

FIGS. 9A and 9B show the second embodiment of the present invention. In this second embodiment, like in the above first embodiment, a transverse-stripe lenticular lens screen 23 is superposed on a longitudinal-stripe lenticular lens screen 14. This second embodiment has essentially the same arrangement as that of the conventional example illustrated in FIG. 4 except that a light diffusing agent 21 is mixed in only the lenticular lens screen 14, i.e., is not mixed in the lenticular lens screen 23.

In this second embodiment, like in the above first embodiment, although it is possible to widen the angle of view by the use of the two lenticular lens screens 14 and 23, the light transmittance is high since the light diffusing agent 21 is mixed only in the lenticular lens screen 14.

In addition, as is apparent from FIG. 9A showing the vertical side surfaces of the lenticular lens screens 14 and 23, two diffusion planes 25 and 26 are formed in the vertical direction by lenticular lenses on the exit side of the lenticular lens screen 23 and by the light diffusing agent 21 mixed in the lenticular lens screen 14, and a spacing d is present between these diffusion planes 25 and 26.

This spacing d allows the lenticular lens screens 14 and 23 to serve as an optical low-pass filter in the vertical direction. Consequently, scan lines of an image are blurred, and this makes Moiré inconspicuous between the lenticular lenses of the transverse-stripe lenticular lens screen 23 and the scan lines of an image. This optical low-pass filter, however, has no influence on resolution in the horizontal direction. Therefore, this second embodiment can realize a three-dimensional angle of view and a high-quality image at the same time.

Figure 10A:
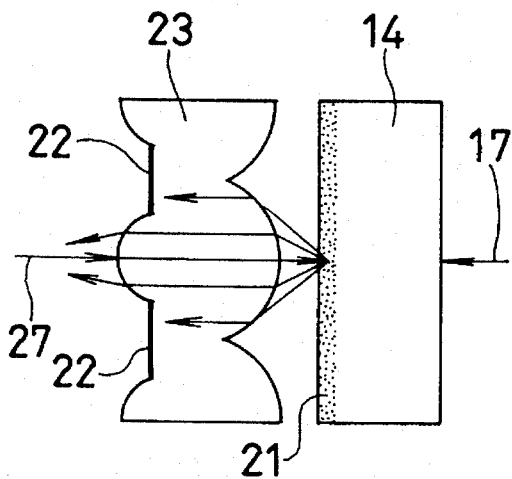
FIG. 10A is a vertical side view showing the third embodiment of the present invention.

FIG. 10A shows the third embodiment of the present invention. This third embodiment has essentially the same arrangement as that of the above second embodiment shown in FIGS. 9A and 9B except that, in contrast to the second embodiment, a longitudinal-stripe lenticular lens screen 14 in which a light diffusing agent 21 is mixed is located on the incident side of light 17, and a transverse-stripe lenticular lens screen 23 in which no light diffusing agent 21 is mixed is located on the exit side of the light 17.

Figure 10B:
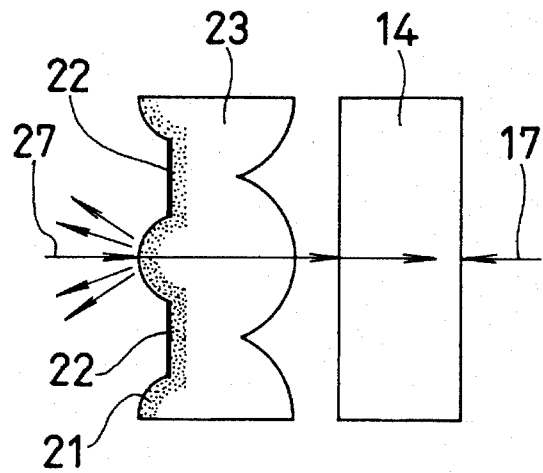
FIG. 10B is a vertical side view for explaining the problem to be solved by the third embodiment.

If the light diffusing agent 21 is also mixed in the lenticular lens screen 23 positioned on the exit side of the light 17, not only the light 17 of an image but external light 27 are diffused by the light diffusing agent 21, as shown in FIG. 10B, and this lowers the contrast of an image.

In this third embodiment, however, the light diffusing agent 21 is mixed only in the lenticular lens screen 14 arranged on the incident side of the light 17. Therefore, as can be seen from FIG. 10A, the external light 27 diffused by this light diffusing agent 21 is absorbed by a black surface 22 of the lenticular lens screen 23. Consequently, this third embodiment can further increase the contrast of an image and achieve a fairly high image quality.

Figure 11:
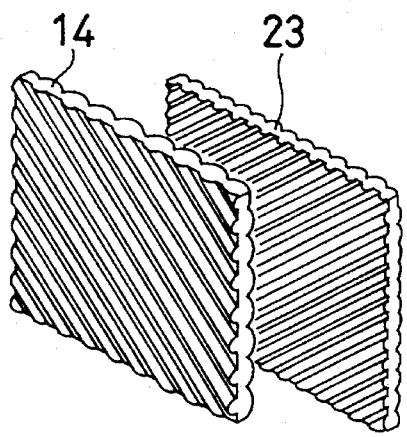
FIG. 11 is a perspective view showing the fourth embodiment of the present invention.
Figure 12A:
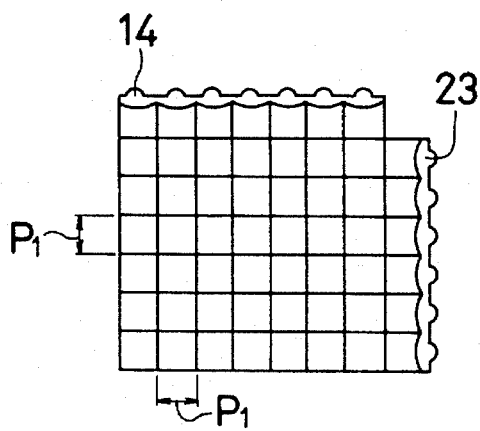
FIGS. 12A and 12B are rear views of a lenticular lens screen for explaining the fourth embodiment.
Figure 12B:
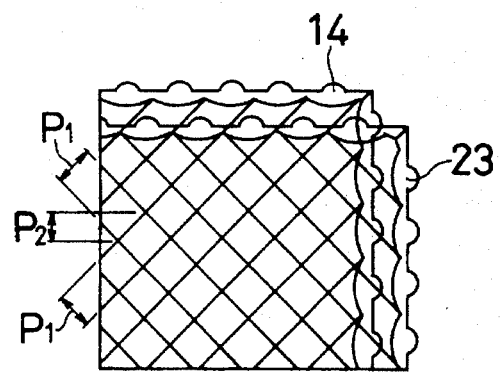

FIGS. 11, 12A and 12B illustrate the fourth embodiment of the present invention. This fourth embodiment has, as shown in FIG. 11, essentially the same arrangement as that of the conventional example shown in FIG. 4 except that a longitudinal-stripe lenticular lens screen 14 and a transverse-stripe lenticular lens screen 23 are rotated 45° with respect to the direction of scan lines of an image while the stripe directions of the two lenticular lens screens 14 and 23 are perpendicular to each other.

In this fourth embodiment with the above arrangement, if the pitch between stripes of the lenticular lens screens 14 and 23 is $P_1$, as shown in FIG. 12A, a pitch $P_2$ between the stripes in the vertical direction of an image is narrow, $P_1/2^{1/2}$, as shown in FIG. 12B. For this reason, the frequency of Moiré between the lenticular lenses and the scan lines of an image in this fourth embodiment is higher than that in the conventional example shown in FIG. 4, and this makes Moiré inconspicuous.

In this fourth embodiment, both the longitudinal-stripe lenticular lens screen 14 and the transverse-stripe lenticular lens screen 23 are rotated 45° with respect to the direction of scan lines of an image. However, it is also possible to rotate the transverse-stripe lenticular lens screen 23 alone.

The fifth embodiment of the present invention will be described below. This fifth embodiment has essentially the same arrangement as that of the conventional example illustrated in FIGS. 5A to 5C except that a microlens screen having a plurality of microlenses arranged into a matrix pattern is rotated with respect to the direction of scan lines of an image, like in FIG. 12B. This fifth embodiment can also achieve an effect similar to that of the above fourth embodiment.

Figure 13:
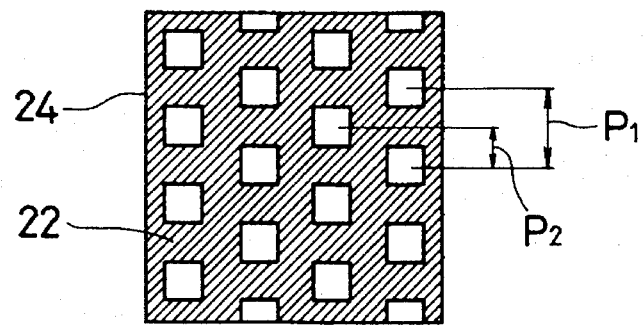
FIG. 13 is a front view showing the sixth embodiment of the present invention.

FIG. 13 shows the sixth embodiment of the present invention. This sixth embodiment has essentially the same arrangement as that of the conventional example illustrated in FIGS. 5A to 5C except that, as shown in FIG. 13, a plurality of microlenses are arranged in a direction perpendicular to the direction of scan lines of an image, and the microlenses in adjacent arrays in the direction of scan lines are offset by a half of the pitch between these microlenses.

In this sixth embodiment, assuming that the pitch between microlenses in one array is $P_1$, an essential pitch $P_2$ in the vertical direction of an image is $P_1/2$ which is further narrower than those of the fourth and fifth embodiments. This further raises the frequency of Moiré between the microlens arrays and the scan lines. For this reason, Moiré in this sixth embodiment is more inconspicuous than those in the fourth and fifth embodiments.

Figure 14:
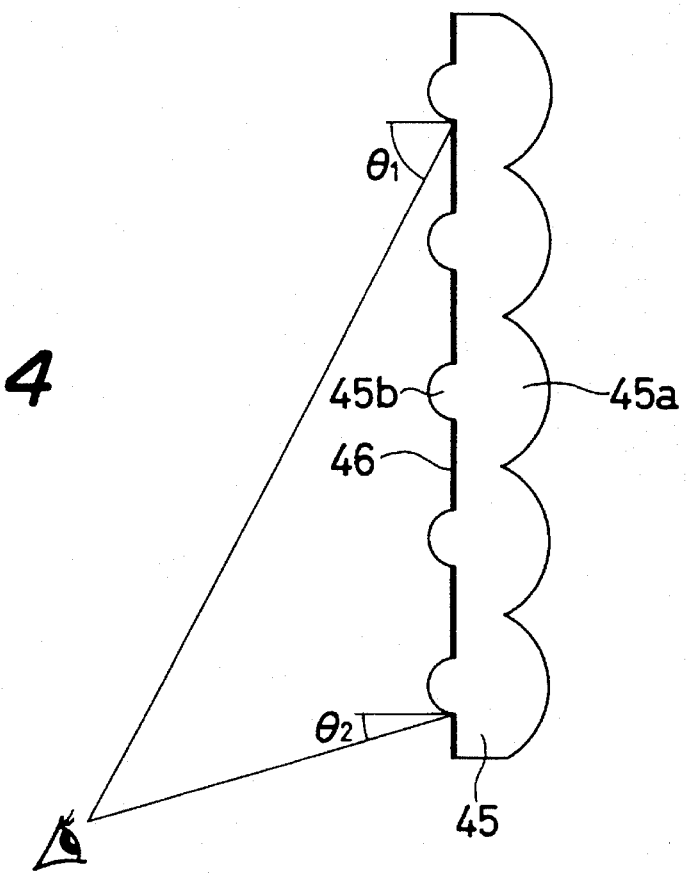
FIG. 14 is a side view showing the seventh embodiment of the present invention.

FIG. 14 shows a lenticular lens screen 45 according to the seventh embodiment of the present invention which is applied to a screen of a three-tube rear projection display. FIG. 14 corresponds to FIG. 8 illustrating one of the above conventional examples. This seventh embodiment has essentially the same arrangement as that of the conventional example shown in FIGS. 6 to 8 except that the whole body of each lens 45b on the exit side of the lenticular lens screen 45 projects in the exit direction of light farther than black stripes 46.

In this lenticular lens screen 45 of the seventh embodiment, the pitch between lenses 45a on the light incident side is 0.78 mm, and the width of each lens 45b on the light exit side is 0.35 to 0.45 mm (i.e., the width of lens 45b is approximately 44.9% to 57.7% of the pitch between the lens 45a).

In this seventh embodiment with the above arrangement, as is apparent from FIG. 14, even if the screen is viewed obliquely, light components emerged from the lenses 45b can be seen without being eclipsed by the black stripes 46 not only in a region in which the angle defined between the normal to the lenticular lens screen 45 and the viewing direction of an eye is small (angle=$\theta_2$) but also in a region in which this angle is large (angle=$\theta_1$). For this reason, the seventh embodiment causes little color shift and color shading, making display of high-quality images possible.

Figure 15:
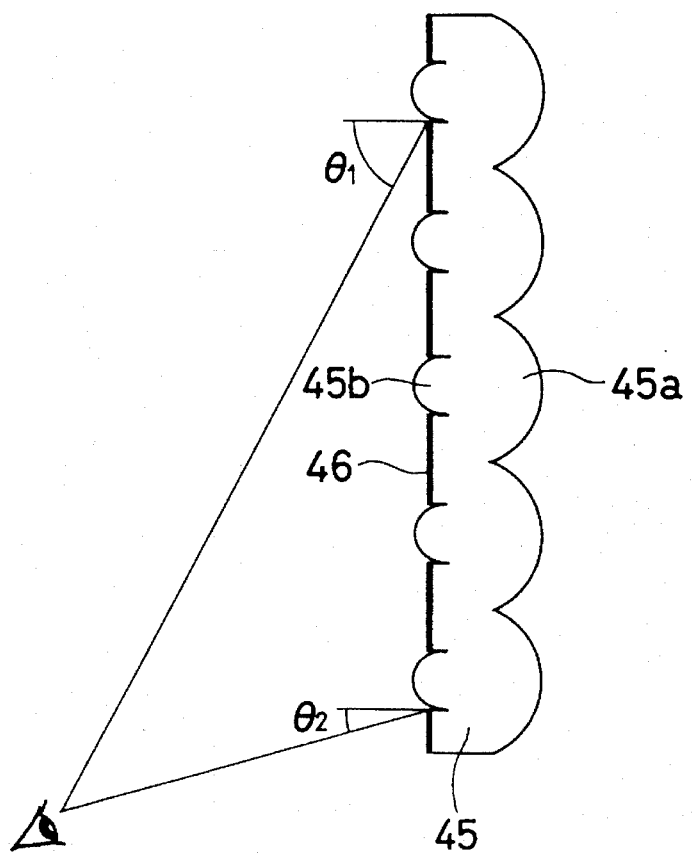
FIG. 15 is a side view showing the eighth embodiment of the present invention.

FIG. 15 shows a lenticular lens screen 45 according to the eighth embodiment of the present invention, and corresponds to FIG. 14 illustrating the above seventh embodiment. This eighth embodiment has essentially the same arrangement as that of the seventh embodiment except that the skirts of lenses 45b on the exit side of the lenticular lens screen 45 are positioned closer to the light incident side than black stripes 46, but the apexes of the lenses 45b project in the light exit direction farther than the black stripes 46.

Figure 6:
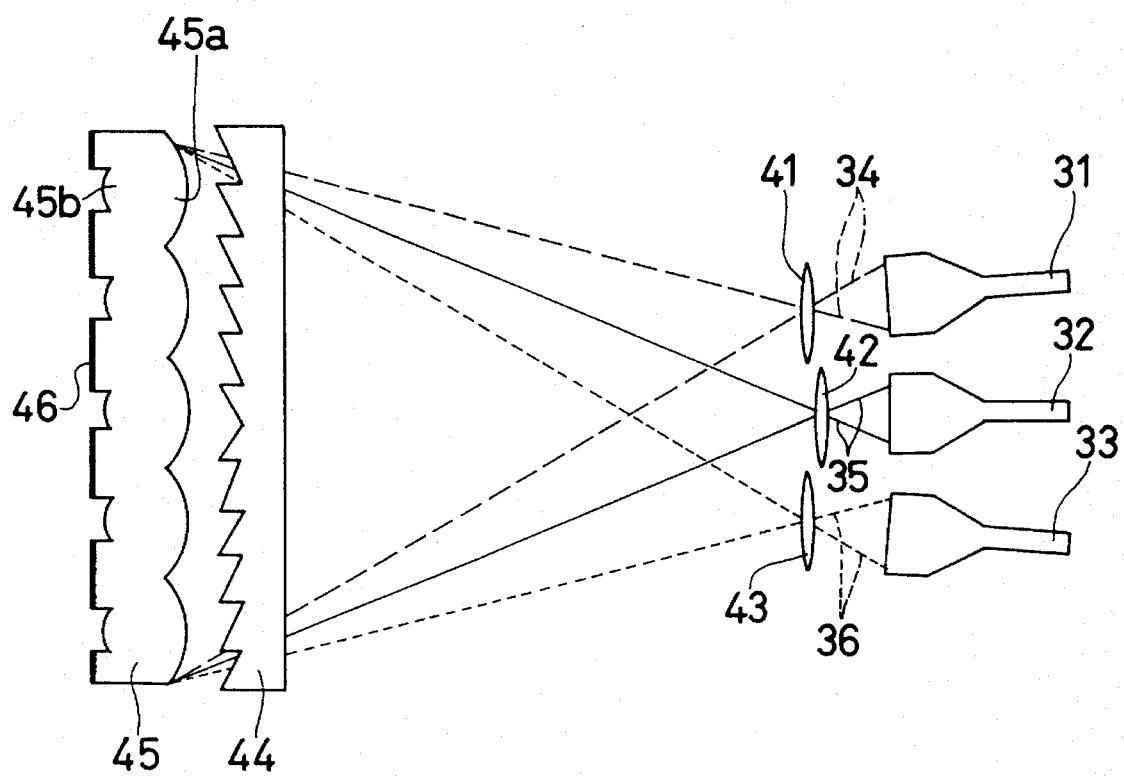
FIG. 6 is a schematic side view showing a projection display using the fourth conventional example.
Figure 7:
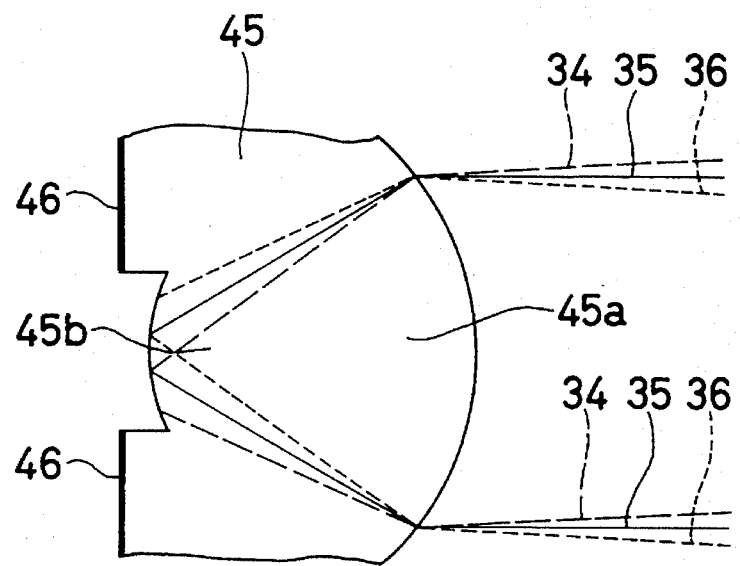
FIG. 7 is an enlarged side view showing the main part of the fourth conventional example.
Figure 8:
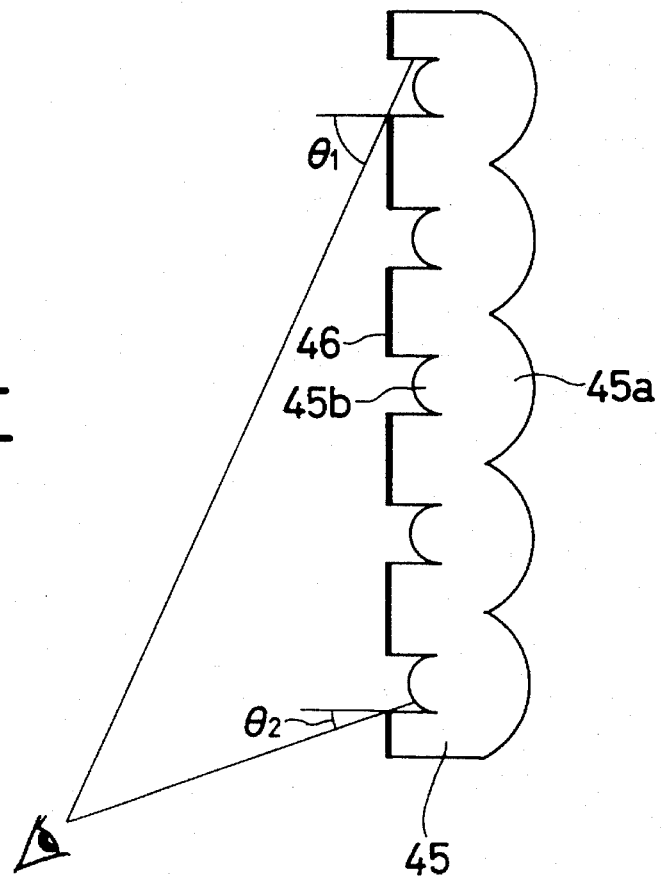
FIG. 8 is a side view for explaining the problem of the fourth conventional example.

In this eighth embodiment with the above arrangement, as can be seen from FIG. 15, even if the screen is viewed obliquely, the amount of light components eclipsed by the black stripes is smaller than that in the conventional example shown in FIGS. 6 to 8. Therefore, the eighth embodiment causes less color shift and color shading than in that conventional example, and this makes it possible to display high-quality images.

What is claimed is:

1. A screen of a projection display, comprising:
   a lenticular lens screen having a plurality of lenses on a light incident side and a plurality of lenses on a light exit side, a pitch between the lenses on the light incident side being approximately 0.78 mm, and a width of each lens on the light exit side being approximately 0.35 to 0.45 mm, and at least the apex of each lens on the light exit side projects in the light exit direction farther than a black surface formed on the light exit side of said lens screen.

2. A screen of a projection display, comprising:
   a lenticular lens screen having a plurality of lenses on a light incident side and a plurality of lenses on a light exit side, a width of each lens on the light exit side of the lens screen being approximately 44.9% to 57.7% of the pitch between the lenses on the light incident side of the lens screen, and at least the apex of each lens on the light exit side projects in the light exit direction farther than a black surface formed on the light exit side of said lens screen.

3. The screen of a projection display according to claim 2, wherein the lenses on the light exit side of the screen comprise skirts that are positioned closer to the light incident side of the screen than the black surface.

* * * * *